Oct. 18, 1960  K. E. HENRIKSON  2,956,432
MATERIAL HARDNESS DETECTOR
Filed July 30, 1956  4 Sheets-Sheet 1
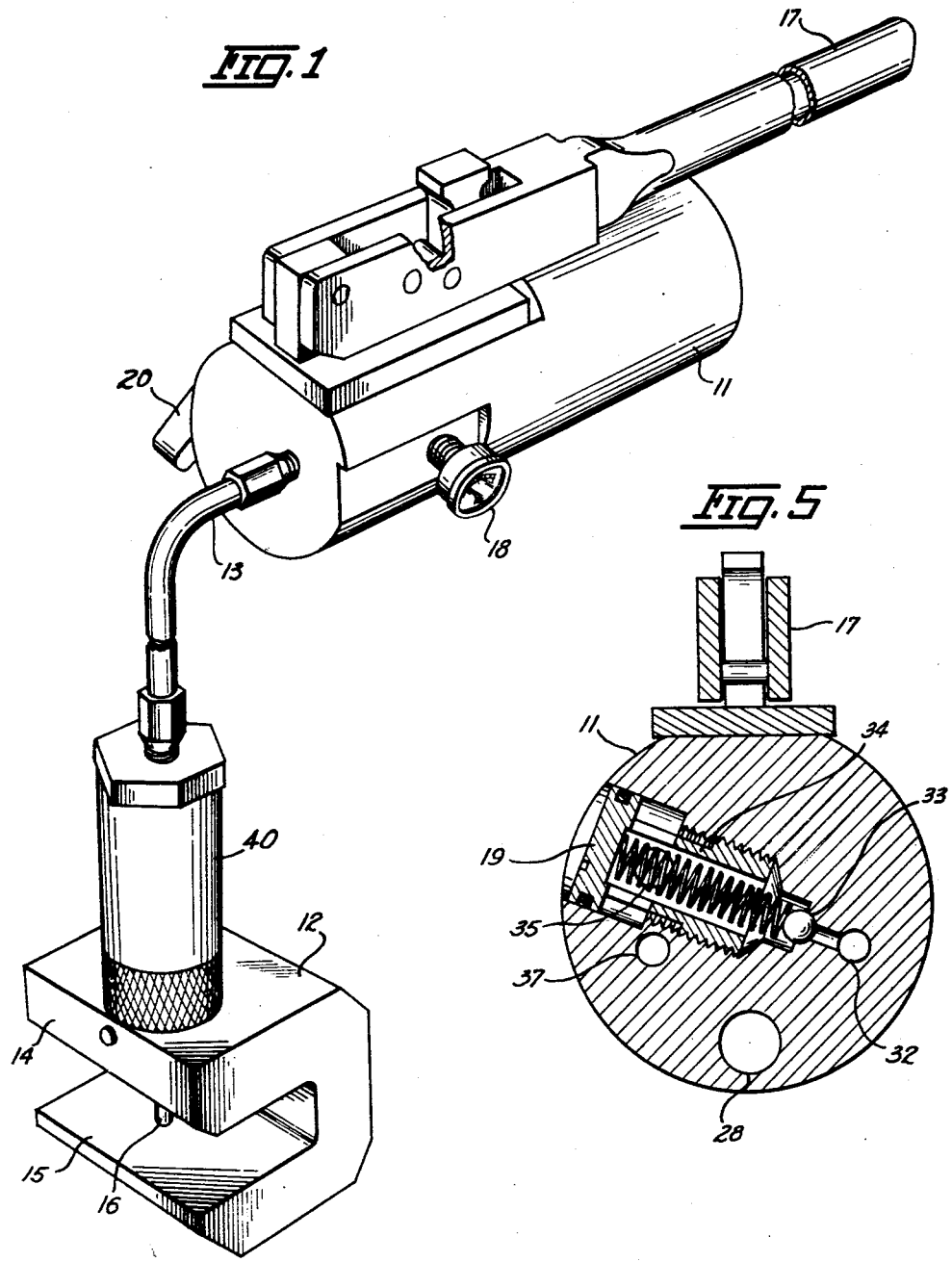
INVENTOR.
KARL E. HENRIKSON
BY
Flournoy Corey
ATTORNEY.

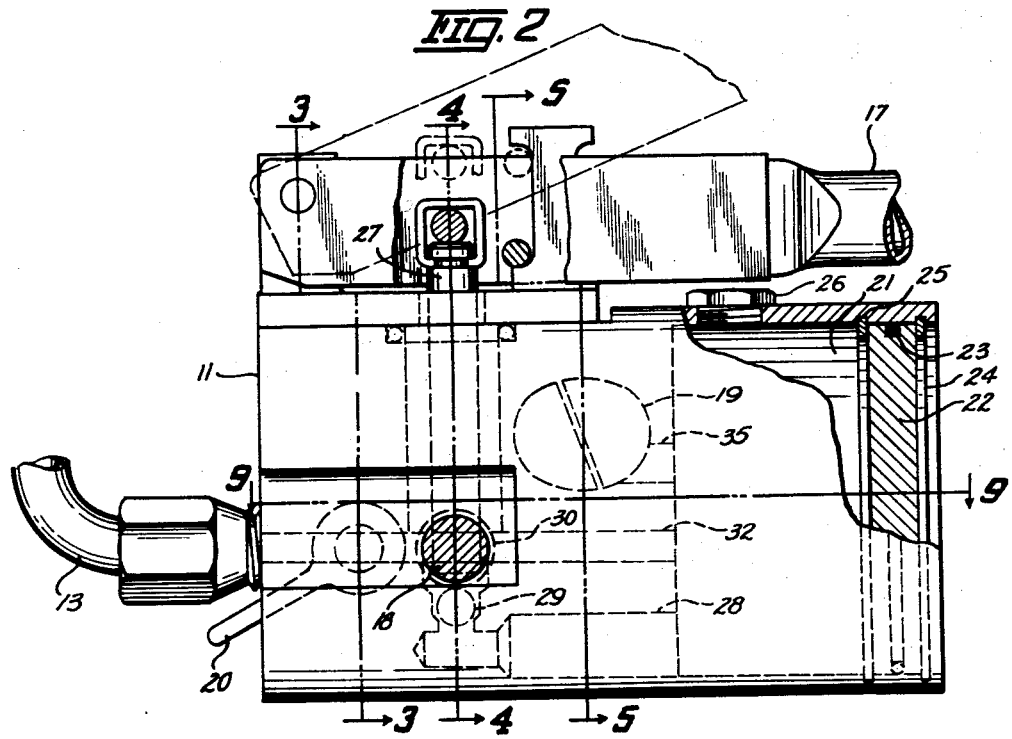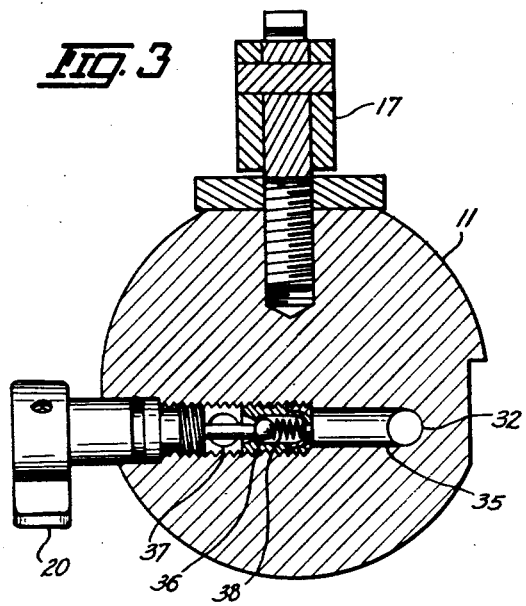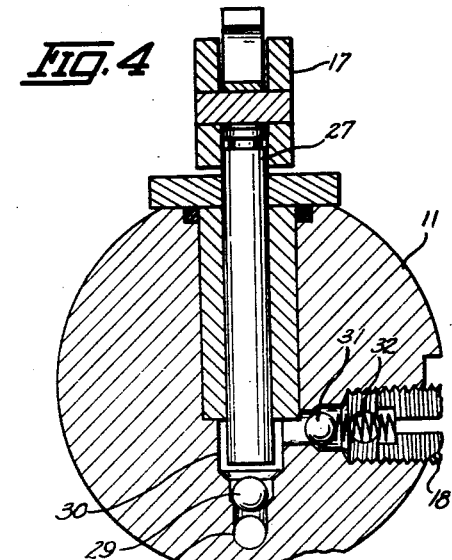

Oct. 18, 1960

K. E. HENRIKSON 2,956,432

MATERIAL HARDNESS DETECTOR

Filed July 30, 1956

INVENTOR.
KARL E. HENRIKSON
BY
Flournoy Corey
ATTORNEY.

Oct. 18, 1960     K. E. HENRIKSON     2,956,432
MATERIAL HARDNESS DETECTOR

Filed July 30, 1956     4 Sheets—Sheet 4

INVENTOR.
KARL E. HENRIKSON
BY
Flournoy Corey
ATTORNEY.

United States Patent Office 2,956,432
Patented Oct. 18, 1960

2,956,432

MATERIAL HARDNESS DETECTOR

Karl E. Henrikson, 2016 Linn Blvd., SE., Cedar Rapids, Iowa; Florence B. Henrikson, executrix of said Karl E. Henrikson, deceased Filed July 30, 1956, Ser. No. 600,802

1 Claim. (Cl. 73—81)

This invention relates to a material hardness detector device, generally to be used in testing metal, such as aluminum, steel, and the like, and is more particularly concerned with a device which is portable and may be used to test large quantities of material rapidly and completely.

It will be apparent from the following description that the device disclosed herein can be used to test many different materials by varying adjustments and applying differing ratios and hydraulic pressures. However, one of the major fields of use would be in the determination of the hardness of standard steel plates and shapes and that the problems encountered in testing steel would be similar to those encountered in testing other materials.

Commercial specifications in the steel industry are based upon certain standard laboratory physical tensile tests. These tests require about a 12" length of steel along with considerable preparation, which obviously cannot be done except on a small percentage of a commercial shipment. Certain hardness tests have a fairly close relationship to the tensile strength. Basically these tests call for the impressing of a steel ball of a certain diameter and hardness against the surface of the steel to be tested under a fixed pressure. The indentation made is then measured for diameter and the hardness number determined.

In practice, such tests as these make it possible to determine hardness numbers over a wide range, but they require 5 to 10 minutes to carry out, and to achieve satisfactory results the surface of the steel being tested must be carefully ground and polished, and even then the depth of penetration is relatively small and the measuring process across the diameter of the depression must be carefully and exactly performed.

In actual practice, steel users find it impractical to test every piece of steel they receive, using this foregoing laboratory method. As a result, only sample tests are conducted and frequently sub-standard steel bars are undetected and subsequently are incorporated into finished equipment, at which time they may fail in their performance. Obviously it would be desirable to test every piece of steel used if such testing could be accomplished rapidly and proper hardness numbers assigned.

It is therefore a primary object of my invention to provide a device capable of making indentations in steel or other material within a limited range so that maximum differences in penetration will detect relatively close hardness numbers.

It is yet another object of my invention to provide a device in which the aforementioned indentation will have sufficient depth of range to permit easy and accurate measurement thereof.

It is yet another object of my invention to provide a device which may be easily transported about a steel yard or fabricating shop and can be used in any position without losing its effectiveness or accuracy.

It is another object of my invention to provide a device which permits easy measurement of steel hardness without the possibility of wide error by reason of paint scale or other surface accumulation or irregularities.

It is yet another object of my invention to provide a device in which relatively high hydraulic pressure can be attained with minimum manual effort and, further, a device in which hydraulic pressures are closely and accurately limited in the desired maximum p.s.i.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claim without departing from the spirit of the invention.

In said drawings:

Figure 1 is a three-quarter view in perspective showing a device constructed according to my invention, including the hydraulic pump and penetrator.

Figure 2 is a side elevation of the hydraulic pump shown in Figure 1, with a portion thereof cut away to show the reservoir.

Figure 3 is a transverse section of a hydraulic pump taken at line 3—3 of Figure 2.

Figure 4 is a transverse section of the hydraulic pump shown in Figure 2 taken at line 4—4 thereof.

Figure 5 is a transverse section of the hydraulic pump shown in Figure 2 taken at line 5—5 thereof.

Figure 6:
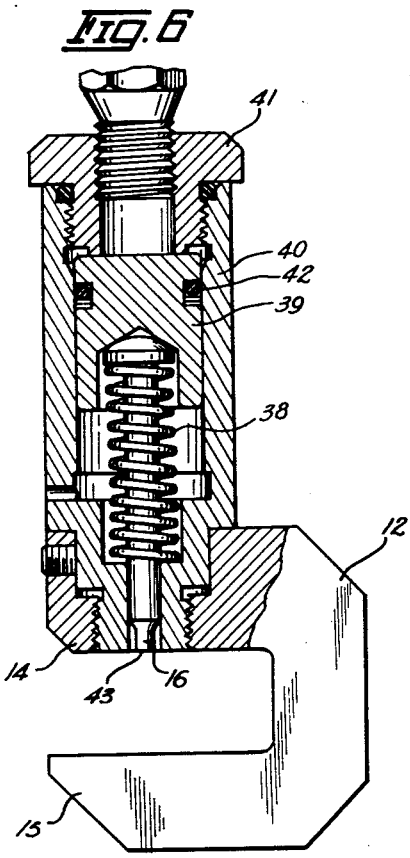
Figure 6 is a cross sectional view in part of the penetrator, showing the penetrator fully retracted.

Referring now to the drawings, and particularly to Figure 1; the device consists of two portions, the hydraulic pump 11 and the penetrator clamp assembly 12, these two portions being connected by hydraulic lines 13. In practice, it is found desirable to utilize pressures of approximately 5,000 pounds per square inch in the applicant's device when testing steel, particularly if the steel to be tested is known to be relatively high carbon, high tensile. In operation, the user places the material to be tested in between the jaws 14 and 15 of the clamp and beneath the penetrator end 16. He then pumps the handle 17 up and down until a pressure of 5,000 pounds or the like is registered on the gauge 18. At that moment, the penetrator 16 will have gone into the material being tested to the maximum depth possible under the predetermined pressure.

In this connection, it should be noted that the adjustable pressure release valve 19 will have been pre-set at the desired pressure, in this instance 5,000 p.s.i. In this way, the danger of any excess hydraulic pressure being introduced into the penetrator assembly is avoided.

When full penetration has been achieved, the operator will move the pressure release handle 20 to an open position, the hydraulic fluid will return to the reservoir 21, and the penetrator will be withdrawn.

At this point, the operator will use any standard measuring device to determine the depth of the hole which has been made by the penetrator, and thus arrive at a reading which will determine the hardness number of the material.

It will be quite apparent that this operation may be performed rapidly and therefore an entire shipment of several hundred bars of steel may be tested within a short time. In actual practice, three or four tests per minute can be made with the applicant's device.

Laboratory test devices cover a range of 80 to 700 Brinell. The applicant's device can be adjusted to be sensitive in various hardness ranges. However a range of 110 to 160 Brinell covers a most used group of structural steels. Generally tensile strength of 70,000 pounds gives a depth reading of .012 inch, and 60,000 pounds tensile .035 inch. It is therefore apparent that an error of .003 plus or minus due to paint, surface condition or decarb, would be insufficient to cause improper classification.

I will now describe in detail the nature of the hydraulic pump, this portion of the device being shown in cross sectional views in Figures 3, 4, 5 and 9. In practice this hydraulic pump is preferably small and utilizing a relatively low volume of hydraulic fluid and is formed in a single bodily unit.

In one end of the hydraulic pump is the previously mentioner reservoir 21, this being closed by the large circular plug 22 having an O ring 23, and two snap rings 24 and 25 which hold the sealed plug in position. A filler plug 26 is positioned at the top of the reservoir. This reservoir is in communication with the operative plunger 27 by means of a passage 28 and a ball check valve 29. A handle 17 serves to move the pressure plunger 27 up and down to build up the required hydraulic pressure, the upward stroke drawing the fluid into the plunger reservoir 30, and the downward stroke serving to force the oil outward through ball check 31 and channel 32 into the hydraulic hose and hence to the penetrator clamp assembly. The gauge 18 is also in communication with channel 32.

The relief valve 19 is at the opposite end of the channel 32 and includes a spring biased ball check valve 33. The spring tension of course is adjustable by varying the position of the plug cap 34, turning it either to the right or left to increase or decrease the spring tension and thus the maximum p.s.i. of the hydraulic pump.

Fluid which bypasses the relief valve 19 returns to the reservoir through the channel or passageway 35. A secondary return passageway system, comprising the passageway 35, the ball check 36, and the return passage 37, acts as a release mechanism once the test is completed. It will be apparent that by turning the handle 20, the ball check valve 36 is opened and the hydraulic fluid is free to return to the central reservoir. The return of this fluid is secured by the presence of a spring 38 in the penetrator assembly.

Referring now to the penetrator clamp assembly; I will describe this portion of the device in detail. The assembly itself 12 is U shaped and comprises two portions, the lower jaw 15 which serves as an anvil, and the upper jaw 14 which holds the penetrator, the hydraulic piston 39, and the hydraulic cylinder or handle 40 in which the piston and penetrator operate. The hydraulic cylinder is in communication with the pump by means of the hose 13 which is screwed into the top cap 41 of the cylinder 40.

An O ring 42 serves to seal the lower portion of the cylinder against hydraulic pressure. It will be obvious that hydraulic fluid introduced into the cylinder will cause the piston to move downwardly and therefore the penetrator as well. The spring 38 causes the penetrator to be withdrawn into the cylinder when the hydraulic pressure is released.

Figure 10:
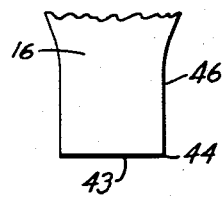
Figure 10 is an enlarged fragmentary view of the penetrator end shown in Figure 7.

The nature of the penetrator is of great importance to the successful practice of this invention. It must, of necessity, be of the highest possible hardness in order to be effective in penetration of other steel. The lower or base face 43 of the penetrator is approximately ⅛ inch in diameter, but can be varied in size for different materials. The outer periphery of this face may either be a square corner, as at 44 of Figures 7 and 10, or slightly rounded as at 45 of Figure 8, but in any event the base face 43 must be substantially flat. Any appreciable roundness of this face causes the metal to be crowded outwardly and upwardly, which in turn contributes to an erroneous reading when the test measurement is taken. If this surface is flat and in proper position, the metal will be partially sheared and compacted or displaced downwardly for the most part below the base of the penetrator, and of course it is the extent of this displacement achieved which provides the reading indicating the hardness or tensile strength range of the material.

Figure 7:
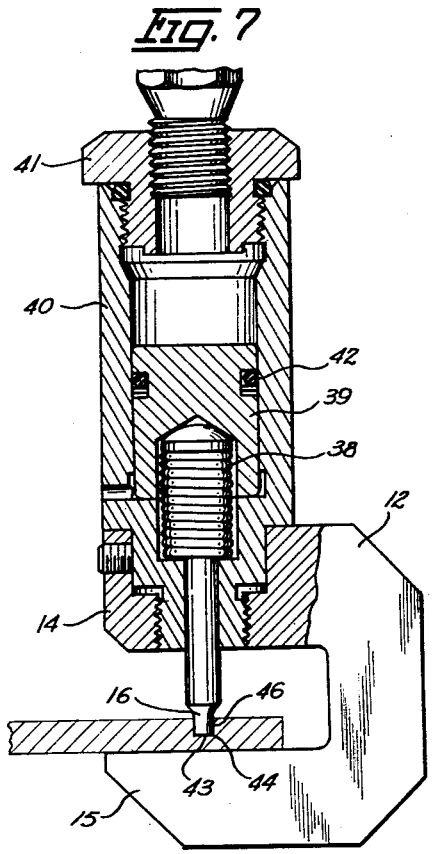
Figure 7 is a cross sectional view similar to that of Figure 6, showing the penetrator fully extended and in engagement with a steel section being tested.
Figure 8:
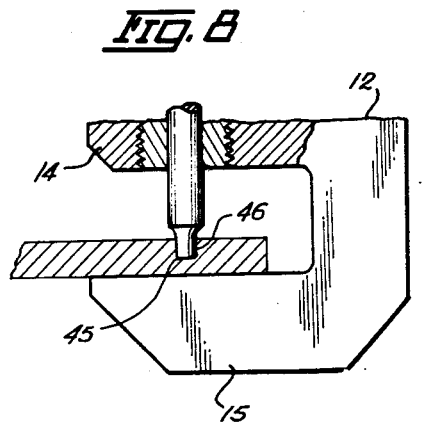
Figure 8 is a partial view of the penetrator showing a slightly modified form thereof.
Figure 9:
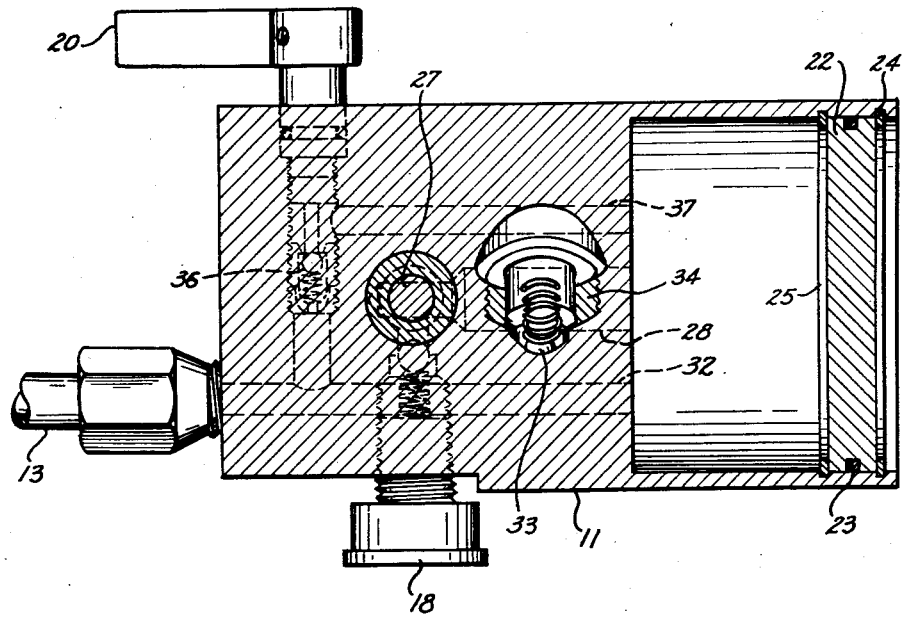
Figure 9 is a top view in cross section of the hydraulic pump shown in Figure 2 to show the internal channels of the hydraulic pump.

It is also essential that the walls of the penetrator immediately above the compacting face be vertical, as indicated at 46 of Figures 7 and 8. There must be a minimum of crowding of the material being tested outwardly or upwardly.

In practice, it will be apparent that the depth of the indentation made by the penetrator will exceed the depth which would be made by a ball or the like of standard design, and that since the hardness range is limited, this depth of penetration can be measured with ease, and that it is the foregoing structure of the penetrator that makes this depth of penetration possible.

In practice, the user is not attempting to determine whether the subject steel piece exactly meets commercial hardness test tolerances, but rather that a soft or low tensile strength steel not be mistaken for high strength material required for some constructions.

Using the applicant's device in testing shipments of several hundred bars of steel, it has been discovered that as little as one-quarter of one percent of the bars may prove to be below satisfactory standards. It is apparent that a mere sampling of such a shipment would easily fail to detect any one of these defective bars, and yet were they to be incorporated in load bearing structures, might easily cause a fatal collapse.

Although I have described a specific embodiment of my invention, it is apparent that modifications thereof may be made by those skilled in the art. Such modifications may be made without departing from the spirit and scope of my invention as set forth in the appended claim.

I claim as my invention:

In a device of the type described a U-shaped member having a tubular handle member with an axial bore attached to extend transversely from one leg of the U-shaped member, said leg of the U-shaped member having an aperture therethrough in alignment with the bore of the tubular handle, a piston in said bore of the tubular handle having an associated elongated penetrator member reciprocable into the opening between the legs of the U-shaped member, biasing means urging the piston and penetrator retracted from said opening, means to apply a fixed amount of hydraulic pressure to said bore of the tubular handle and against the piston therein to move the same and the penetrator into a metallic piece to be tested that is placed in said U-shaped member whereby the depth of penetration for said fixed amount of pressure is indicative of hardness and the like condition of said metallic piece tested, said means to apply a fixed amount of hydraulic pressure including a gauge and an adjustable relief valve attached to said pressure means, said penetrator having a flat, horizontal face of such area as to resist penetration below the yield point of said piece tested, and to penetrate said piece tested to a substantial depth above the yield point thereof, said extent of penetration being relative to said selected pressure, said penetrator being shaped to compact and shear said material without causing the material to be crowded outwardly transverse to said direction of application of pressure and upwardly opposite to said direction of application of pressure.

References Cited in the file of this patent

UNITED STATES PATENTS

| | | |
|---|---|---|
| 499,739 | Hunt | June 20, 1893 |
| 1,320,748 | Fisher | Nov. 4, 1919 |
| 1,376,413 | Fairholme | May 3, 1921 |
| 2,009,316 | Gogan | July 23, 1935 |
| 2,038,487 | Gogan | Apr. 21, 1936 |
| 2,448,486 | Chester | Aug. 31, 1948 |
| 2,645,936 | Albrecht | July 21, 1953 |